US011421788B2

(12) United States Patent
Fang

(10) Patent No.: US 11,421,788 B2
(45) Date of Patent: Aug. 23, 2022

(54) VALVE

(71) Applicant: SHANGHAI HONGYAN RETURNABLE TRANSIT PACKAGINGS CO., LTD., Shanghai (CN)

(72) Inventor: Zhengwei Fang, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 69 days.

(21) Appl. No.: 16/636,302

(22) PCT Filed: Jun. 19, 2018

(86) PCT No.: PCT/CN2018/091813
§ 371 (c)(1),
(2) Date: Feb. 3, 2020

(87) PCT Pub. No.: WO2019/024618
PCT Pub. Date: Feb. 7, 2019

(65) Prior Publication Data
US 2020/0191278 A1 Jun. 18, 2020

(30) Foreign Application Priority Data
Aug. 2, 2017 (CN) .......................... 201710653134.7

(51) Int. Cl.
F16K 1/20 (2006.01)
F16K 31/53 (2006.01)

(52) U.S. Cl.
CPC .............. F16K 1/2057 (2013.01); F16K 1/20 (2013.01); F16K 1/2014 (2013.01); F16K 31/535 (2013.01)

(58) Field of Classification Search
CPC ........ F16K 1/2057; F16K 1/20; F16K 1/2014; F16K 1/24; F16K 1/2007; F16K 1/2064;
(Continued)

(56) References Cited

U.S. PATENT DOCUMENTS 2,597,474 A 5/1952 Griffith
3,462,120 A * 8/1969 Priese ................... F16K 27/067
251/315.14
(Continued)

FOREIGN PATENT DOCUMENTS

CN 103016776 A 4/2013
CN 105805321 A 7/2016
(Continued)

OTHER PUBLICATIONS

International Search Report (in English and Chinese) and Written Opinion issued in PCT/CN2018/091813, dated Aug. 24, 2018, total 10 pages provided.
(Continued)

Primary Examiner — Umashankar Venkatesan
Assistant Examiner — Andrew J Rost
(74) Attorney, Agent, or Firm — Hamre, Schumann, Mueller & Larson, P.C.

(57) ABSTRACT

Disclosed is a valve, comprising a valve body, an inner valve seat and a valve core. The valve core is mounted in the valve body. The inner valve seat is mounted in the valve body. The inner valve seat has a annular body and a seal structure extending inwards from an inner peripheral surface of the annular body, wherein the seal structure is arranged in such a manner that the seal structure seals a gap formed among the valve body, the inner valve seat and the valve core when the valve is in a closed state. After the valve is used for discharging liquid, the amount of liquid residue inside the valve can be greatly reduced.

5 Claims, 16 Drawing Sheets

(58) Field of Classification Search
CPC ...... F16K 1/2071; F16K 1/427; F16K 31/535; F16K 31/52441
USPC .......................... 251/314, 316, 317, 298, 301
See application file for complete search history.

(56) References Cited

U.S. PATENT DOCUMENTS

| | | | |
|---|---|---|---|
| 3,488,033 A * | 1/1970 | Priese ..................... | F16K 5/202 251/172 |
| 3,650,508 A | 3/1972 | Kosmala | |
| 3,817,490 A | 6/1974 | Deeg | |
| 4,157,170 A * | 6/1979 | McClurg ................ | F16K 5/0668 251/315.01 |
| 4,176,820 A * | 12/1979 | Broadway ............. | F16K 1/2263 251/173 |
| 4,195,815 A | 4/1980 | Stager | |
| 4,822,000 A * | 4/1989 | Bramblet ............... | F16K 5/0647 251/180 |
| 9,897,230 B2 * | 2/2018 | Gong ...................... | F16K 31/60 |
| 10,823,292 B2 * | 11/2020 | Fang ..................... | F16K 1/2014 |
| 2004/0036052 A1 * | 2/2004 | Nowak ................. | F16K 5/0673 251/314 |
| 2015/0083955 A1 | 3/2015 | Lenhert et al. | |
| 2016/0138719 A1 | 5/2016 | Kennedy | |

FOREIGN PATENT DOCUMENTS

| | | |
|---|---|---|
| CN | 105864497 A | 8/2016 |
| CN | 107420559 A | 12/2017 |
| CN | 207278903 U | 4/2018 |
| DE | 1295218 B | 5/1969 |
| DE | 102014108379 A1 | 1/2016 |
| GB | 1305554 A | 2/1973 |
| GB | 2537134 A | 10/2016 |
| JP | 2007170616 A | 7/2007 |
| WO | 2017125075 A1 | 7/2017 |

OTHER PUBLICATIONS

Office Action issued in corresponding Japanese Application No. 2020505373, dated Jun. 8, 2021, with English translation.
Examination Report issued in Australian Patent Application No. 2018311714, dated Jan. 19, 2021.
The extended European search report issued in European Application No. 18842043.4, dated Mar. 16, 2021.

* cited by examiner

VALVE

CROSS REFERENCE TO RELATED APPLICATIONS

This application claims the priority of the Chinese application No. 2017106531347, titled "VALVE" filed on Aug. 2, 2017, the contents of which are incorporated by reference herein.

TECHNICAL FIELD

The present invention relates to valves, and more particularly to valves used in logistics transportation equipment.

BACKGROUND

Existing valves for medium-sized bulk storage containers basically have more or less residual gaps between the valve sealing surface and the outside channel, especially for valve used in food-grade applications. Once there are uncleanable gaps, it will cause residual cleaning liquid and other harmful substances will breed bacteria, cause food contamination, and lead to accidents.

Chinese patent ZL201110260851.6 discloses a low-torque ball valve. When the valve is closed and the valve is cleaned from the front, some of the cleaning liquid will be remained between the valve core and the valve seat positioning device. As a result, residual cleaning liquid and other harmful substances will breed bacteria and cause food contamination.

SUMMARY

The object of the present application is to provide a valve which can reduce or even eliminate the residue of liquid in the valve.

To achieve the above object, the present application provides a valve including a valve body, an inner valve seat and a valve core, wherein the valve core is installed in the valve body, and the inner valve seat is installed in the valve body, wherein the inner valve seat has an annular body and a sealing structure, wherein the sealing structure is arranged such that when the valve is in a closed state, the sealing structure seals and/or fills gaps formed among the valve body, the inner valve seat, and the valve core.

In one embodiment, the sealing structure extends inwards from an inner peripheral surface of the annular body.

In one embodiment, the sealing structure extends inwards along the entire inner peripheral surface of the annular body and is provided with an elastic portion and a first sealing portion in sequence, wherein the first sealing portion is configured to abut the side of the valve core facing the inner valve seat when the valve is in a closed state.

In one embodiment, the first sealing portion protrudes from a distal end of the elastic portion toward the valve core.

In one embodiment, the sealing structure extends radially inwards along the entire inner peripheral surface of the annular body.

In one embodiment, the inner valve seat is further provided with a main sealing portion, wherein the main sealing portion is provided on the annular body and is arranged to abut against the side of the valve core facing the inner valve seat when the valve is in a closed state, and the position where the main sealing portion abuts the valve core is located radially outward compared with the position where the first sealing portion abuts the valve core.

In one embodiment, a second sealing portion and a third sealing portion are provided on a side of the valve core facing the inner valve seat, wherein the second sealing portion is located radially outward with respect to the third sealing portion, and when the valve is in a closed state, the second sealing portion is engaged with the main sealing portion, and the third sealing portion is engaged with the first sealing portion.

In one embodiment, the valve core is hinged to the valve body and the valve further includes a handle and a valve stem, wherein the handle is provided with a driving gear, the valve stem is provided with a driven gear, and the driving gear mates with the driven gear, so that rotation of the handle drives the valve stem to rotate, which in turn drives the valve core to rotate.

In one embodiment, the valve further includes a driving member, wherein the driving member is fixedly connected to the valve stem, and a connecting portion is provided on the valve core, wherein the connecting portion is provided with a first groove, the driving member is mounted in the first groove and is provided with a shoulder, and a shoulder mating surface is provided on the first groove, wherein the rotation of the valve stem drives the driving member to rotate and cause the opening of the valve through cooperation between the shoulder and the shoulder mating surface.

In one embodiment, the driving member is provided with a first valve stem mounting hole, and two sides of the first groove of the connecting portion are provided with second valve stem mounting holes, and the valve stem is inserted into the first valve stem mounting hole and the second valve stem mounting hole, so that the rotation of the valve stem drives the driving member to rotate.

In one embodiment, a valve core mounting portion is provided in the valve body, wherein the valve core mounting portion is provided with a second groove, and two sides of the second groove are provided with valve stem positioning holes, wherein the connecting portion of the valve core is installed in the second groove, and the valve stem passes through the valve stem positioning hole, the first valve stem mounting hole, the second valve stem mounting hole, and the connecting portion so that the valve core is rotatably installed in the valve body.

In one embodiment, the valve core is hinged to the valve body and the valve further includes a handle and a valve stem, wherein the handle and the valve stem have different axes of rotation, the handle and the valve stem have a transmission relationship of synchronous rotation, and the rotation of the handle transmits a synchronous rotation with angle amplification to the valve stem, so as to drive the valve core to rotate.

In one embodiment, the handle is provided with a driving gear, and the valve stem is provided with a driven gear, and the driving gear mates with the driven gear, so that rotation of the handle drives the valve stem to rotate, and then drives the valve core to rotate.

In one embodiment, the valve further includes a driving member, wherein the driving member is fixedly connected to the valve stem, a connecting portion is provided on the valve core, the connecting portion is provided with a first groove, the driving member is mounted in the first groove and is provided with a shoulder, and a shoulder mating surface is provided in the first groove, wherein the rotation of the valve stem drives the driving member to rotate and cause the opening of the valve through cooperation between the shoulder and the shoulder mating surface.

In one embodiment, the driving member is provided with a first valve stem mounting hole, and two sides of the first groove of the connecting portion are provided with second valve stem mounting holes, and the valve stem is inserted into the first valve stem mounting hole and the second valve stem mounting hole, so that the rotation of the valve stem drives the driving member to rotate.

In one embodiment, a valve core mounting portion is provided in the valve body, wherein the valve core mounting portion is provided with a second groove, and two sides of the second groove are provided with valve stem positioning holes, wherein the connecting portion of the valve core is installed in the second groove, and the valve stem passes through the valve stem positioning hole, the first valve stem mounting hole, the second valve stem mounting hole, and the connecting portion so that the valve core is rotatably installed in the valve body.

In one embodiment, the valve core is hinged to the valve body, and the valve further includes a driving member, a positioning member, and an elastic member, wherein the positioning member is movably mounted on the valve core, the elastic member is installed between the positioning member and the valve core, and the disengageable relationship between the driving member and the positioning member imparts the valve with the following three transmission relationships during the closing process:

the driving member cooperates with the positioning member to form a relatively static first transmission relationship under the elastic action of the elastic member, and drives the valve core to rotate to close the valve core; when the first transmission relationship ends, the driving member and the positioning member are switched from a first transmission relationship to a second transmission relationship, in which the driving member presses the positioning member to cause the positioning member to move with respect to the valve core; and when the second transmission relationship ends, the driving member and the positioning member are switched from the second transmission relationship to a third transmission relationship between the driving member and the valve core, in which the driving member controls the positioning member in an extended state so that the positioning member is always in a state of cooperating with the valve body, and the driving member presses the valve core to perform a press movement along the axis of the flow passage of the valve, thereby sealingly locking the valve core.

The present application further provides a valve including a valve body, an inner valve seat and a valve core, wherein the valve core is installed in the valve body, and the inner valve seat is installed in the valve body and has an annular body, wherein a main sealing portion is provided on the annular body and is arranged to abut against the side of the valve core facing the inner valve seat when the valve is in a closed state, wherein the inner valve seat is further provided with a sealing structure, wherein the sealing structure extends inwards along the entire inner peripheral surface of the annular body and is provided with an elastic portion and a sealing portion in sequence, wherein the sealing portion is configured to abut the side of the valve core facing the inner valve seat when the valve is in a closed state. and the position where the main sealing portion abuts the valve core is located radially inward compared with the position where the sealing portion abuts the valve core.

In one embodiment, the valve core is hinged to the valve body and the valve further includes a handle and a valve stem, wherein the handle is provided with a driving gear, the valve stem is provided with a driven gear, and the driving gear mates with the driven gear, so that rotation of the handle drives the valve stem to rotate, and further drives the valve core to rotate.

In one embodiment, the valve core is hinged to the valve body and the valve further includes a handle and a valve stem, wherein the handle and the valve stem have different axes of rotation, the handle and the valve stem have a transmission relationship of synchronous rotation, and the rotation of the handle transmits a synchronous rotation with angle amplification to the valve stem, so as to drive the valve core to rotate.

In one embodiment, the valve core is hinged to the valve body, and the valve further includes a driving member, a positioning member, and an elastic member, wherein the positioning member is movably mounted on the valve core, the elastic member is installed between the positioning member and the valve core, and the disengageable relationship between the driving member and the positioning member imparts the valve with the following three transmission relationships during the closing process:

the driving member cooperates with the positioning member to form a relatively static first transmission relationship under the elastic action of the elastic member, and drives the valve core to rotate to close the valve core; when the first transmission relationship ends, the driving member and the positioning member are switched from a first transmission relationship to a second transmission relationship, in which the driving member presses the positioning member to cause the positioning member to move with respect to the valve core; and when the second transmission relationship ends, the driving member and the positioning member are switched from the second transmission relationship to a third transmission relationship between the driving member and the valve core, in which the driving member controls the positioning member to keep in an extended state so that the positioning member is always in a state of cooperating with the valve body, and the driving member presses the valve core to perform a press movement along the axis of the flow passage of the valve, thereby sealingly locking the valve core.

The application also provides a valve including a valve body, an inner valve seat, and a valve core, the valve core and the inner valve seat are installed in the valve body, the valve body is formed with a flow channel, and the valve core is configured to be capable of performing a pressing motion on the inner valve seat relative to the valve body, and has a movement component along an axis of the flow channel, wherein the inner valve seat is configured to seal and/or fill a gap formed among the inner valve seat, the valve core, and the valve body when the valve is in the closed state.

Since the valve of the present application is provided with a sealing structure that prevents liquid from entering the gap among the valve body, the valve core, and the inner valve seat, it can greatly reduce the liquid residue inside the valve and reduce pollution.

BRIEF DESCRIPTION OF THE DRAWINGS

FIGS. 9-13A are sectional views of a valve according to an embodiment of the present application, which shows the transmission relationship of the valve of the present application during the closing process; wherein FIGS. 9-9A are valves in an open state, wherein FIG. 9 is a sectional view, and FIG. 9A is a perspective view; FIGS. 10-10A illustrate a first transmission relationship, wherein FIG. 10 is a cross-sectional view, and FIG. 10A is a perspective view; FIGS. 11-12A illustrate a second transmission relationship, wherein FIGS. 11 and 12 are sectional views, and FIGS. 11A and 12A are perspective views; and FIGS. 13-13A illustrate a third transmission relationship, in which FIG. 13 is a cross-sectional view and FIG. 13A is a perspective view.

DETAILED DESCRIPTION

Figure 1:
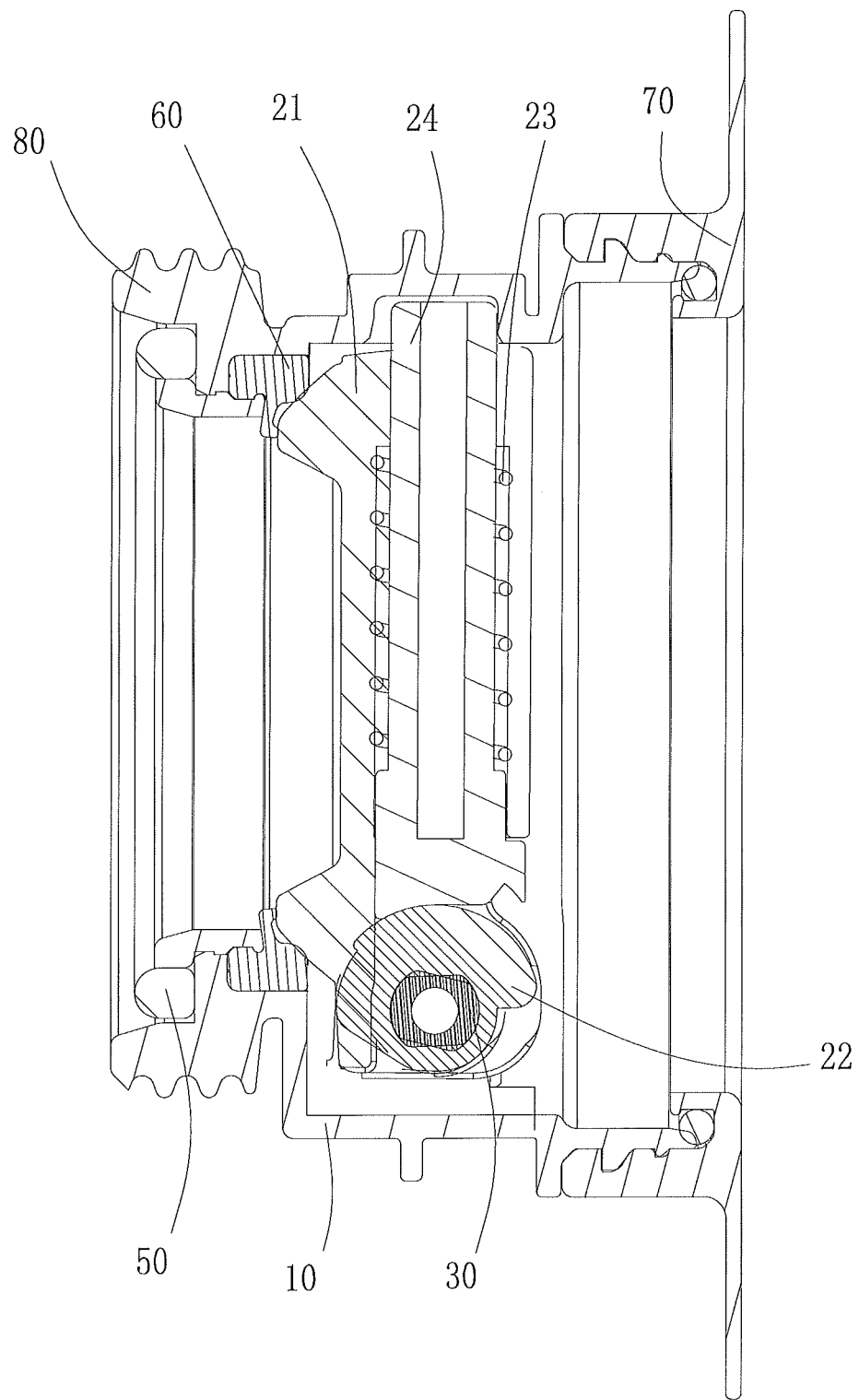
FIG. 1 is a sectional view of a valve according to an embodiment of the present application, in which the valve is closed and sealed.

Hereinafter, preferred embodiments of the present application will be described in detail with reference to the drawings, so as to more clearly understand the objects, features, and advantages of the present application. It should be understood that the embodiments shown in the drawings are not intended to limit the scope of the present application, but merely to explain the essential spirit of the technical solution of the present application.

In the following description, certain specific details are set forth for the purpose of illustrating various disclosed embodiments to provide a thorough understanding of the various embodiments. One skilled in the art will recognize, however, that the embodiments may be realized without one or more of these specific details. In other cases, well-known devices, structures, and techniques associated with the present application may not be shown or described in detail to avoid unnecessarily obscuring the description of the embodiments.

The words "including" and variations such as "comprising" and "having" in the specification and claims should be construed as open and inclusive meaning that they should be construed as "including, but not limited to", unless the context requires otherwise.

Reference throughout the specification to "one embodiment" or "an embodiment" means that a particular feature, structure, or characteristic described in connection with the embodiment is included in at least one embodiment. Thus, expression of "in one embodiment" or "In one embodiment" in various places throughout the specification are not necessarily all referring to the same embodiment. Furthermore, the particular features, structures, or characteristics may be combined in any manner in one or more embodiments.

As used in this specification and the appended claims, the singular forms "a", "the" and "said" include plural referents unless the context clearly dictates otherwise. It should be noted that the term "or" is generally used in its sense including "and/or" unless the context clearly dictates otherwise.

Figure 2:
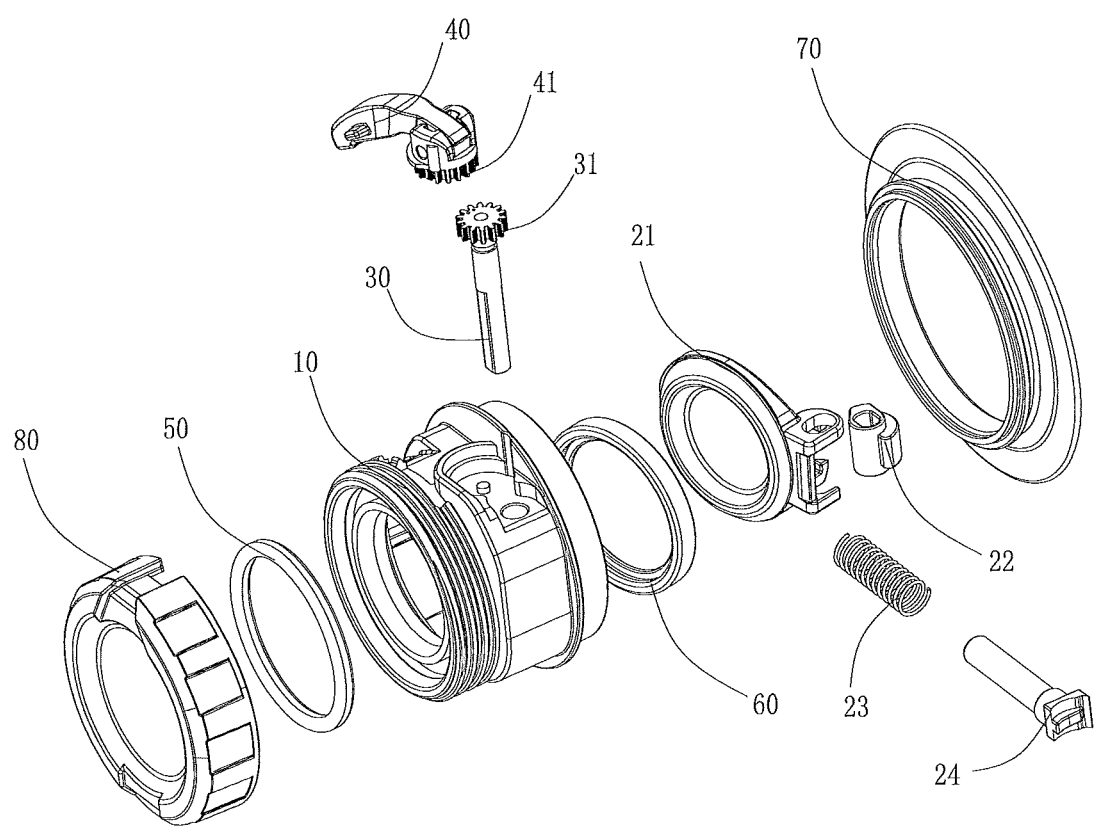
FIG. 2 is an exploded view of a valve according to an embodiment of the present application.

As shown in FIGS. 1-2, the valve 100 includes a valve body 10, a valve core assembly 20, a valve stem 30, a handle 40, an outer valve seat 50, an inner valve seat 60, a flange 70, and a cover 80. The valve core assembly 20 includes a valve core 21, a driving member 22, an elastic member 23, and a positioning member 24. The valve core assembly 20 is installed in the valve body 10, and the valve core 21 is hinged to the valve body 10. The outer valve seat 50 is provided between the valve body 10 and the cover 80. The inner valve seat 60 is disposed between the valve core 21 and the valve body 10. In the closed state, the inner valve seat cooperates with the valve core so that the space formed among the valve core, the valve body and the inner valve seat is at least partially filled and/or fully sealed. Therefore, liquid that might be remained in the space among the valve core, the valve body and the inner valve seat of the valve is reduced or even eliminated, which will be described in further detail below. The cover 80 is provided at the outlet end of the valve body 10. The flange 70 is provided at the inlet end of the valve body 10. A flow channel is formed between the inlet end and the outlet end of the valve body. The flow channel has an axis extending from the inlet end to the outlet end. The handle 40 is provided with a driving gear 41, and the valve stem 30 is provided with a driven gear 31. The driving gear 41 is engaged with the driven gear 31, so that the rotation of the valve stem 30 can be driven by the rotation of the handle 40.

The following describes a valve core assembly according to an embodiment of the present application with reference to FIGS. 3-6B.

Figure 3:
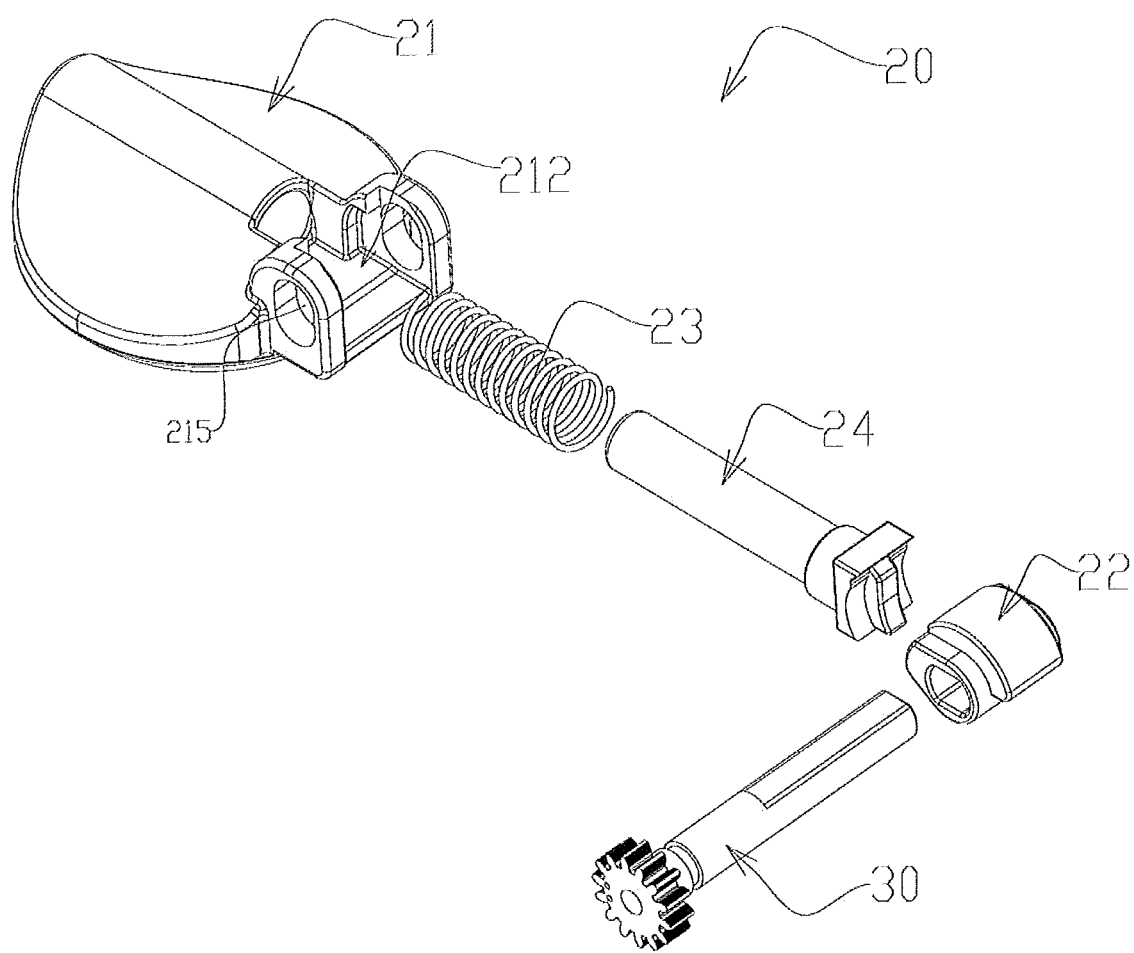
FIG. 3 is an exploded view of a valve core assembly according to an embodiment of the present application.
Figure 4:
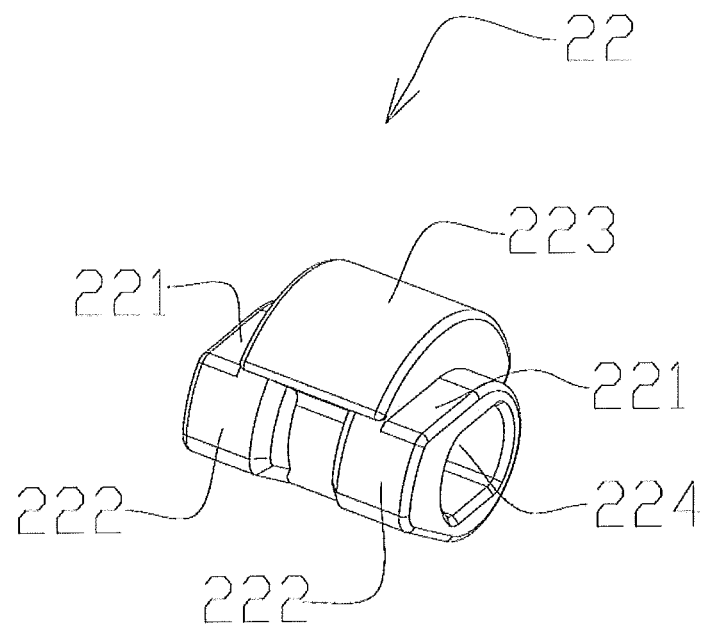
FIG. 4 is a perspective view of a driving member according to an embodiment of the present application.
Figure 4A:
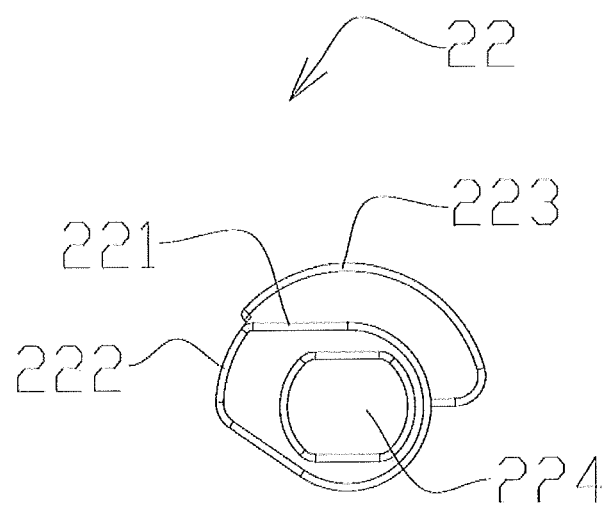
FIG. 4A is a left side view of a driving member according to an embodiment of the present application.

As shown in FIGS. 3, 4 and 4A, the driving member 22 is provided with a shoulder 221, a locking cam 222, a control cam 223, and a first valve stem mounting hole 224. Wherein, the control cam 223 is located in the middle of the driving member 22 and is used to engage with a cam mating surface 241 provided on the positioning member 24 so as to drive the positioning member to slide through the rotation of the driving member. The shoulder 221 is provided on both sides of the control cam 223 and is used to engage with the shoulder mating surface 213 of the valve core 21 so as to realize valve opening. The locking cams 222 are located behind the shoulder 221 and are used to engage with locking projections 214 of the valve core 21 so as to achieve a third transmission relationship. The first valve stem mounting hole 224 is formed through the driving member 22, and the valve stem 30 can be inserted into the first valve stem mounting hole 224, so that the driving member 22 can be driven to rotate by the rotation of the valve stem 30. The cooperation relationship among parts of the driving member 22, the valve core 21, and the positioning member 24 will be described in detail below.

Figure 5:
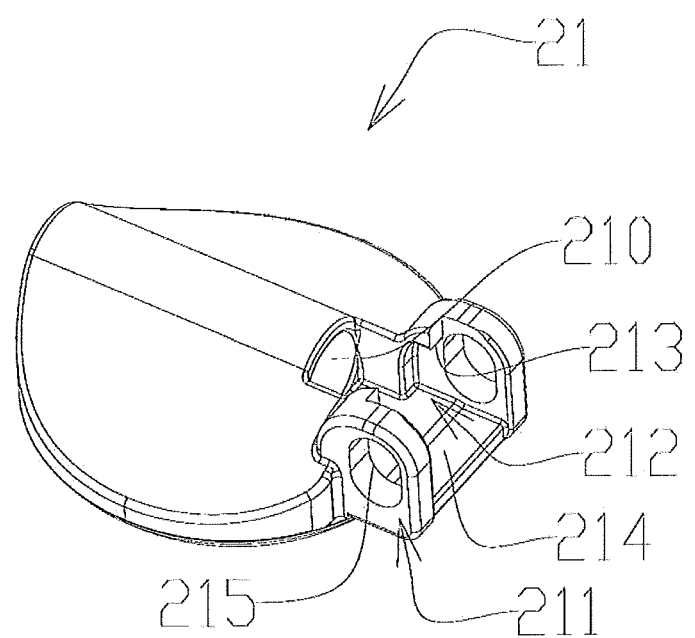
FIG. 5 is a perspective view of a valve core according to an embodiment of the present application.
Figure 5A:
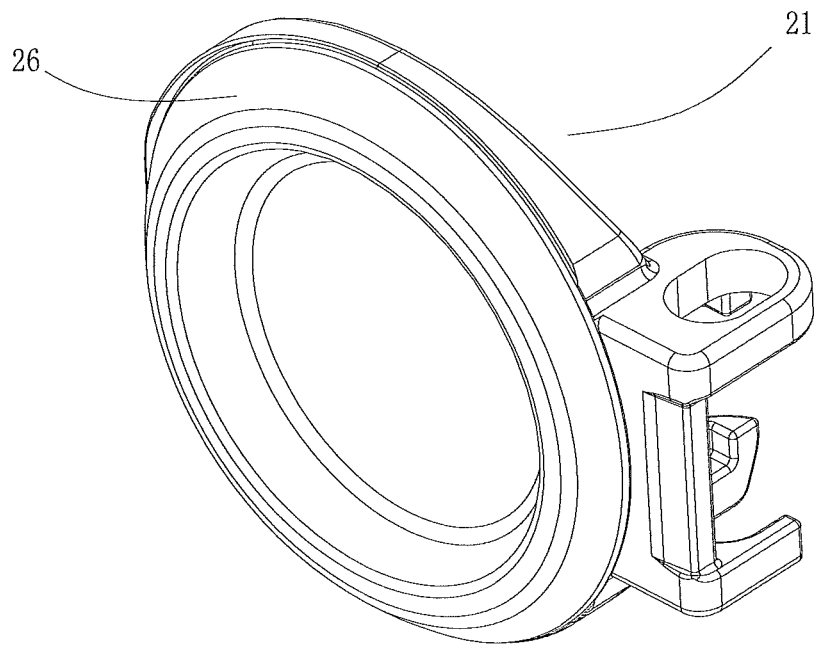
FIG. 5A is another perspective view of the valve core of FIG. 5.
Figure 5B:
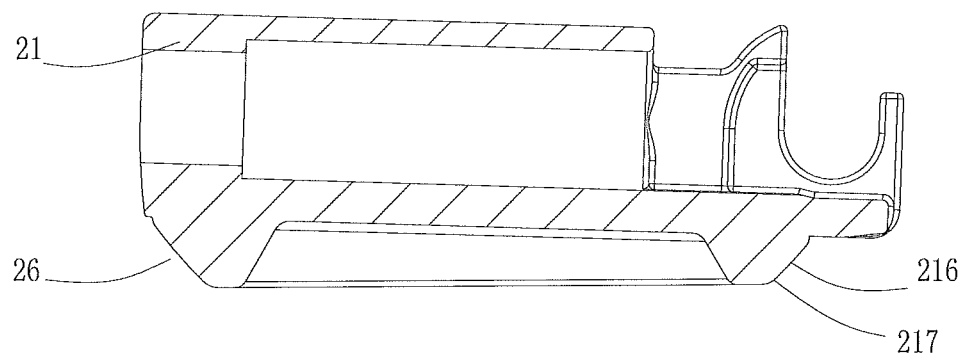
FIG. 5B is a cross-sectional view of the valve core of FIG. 5.
Figure 6:
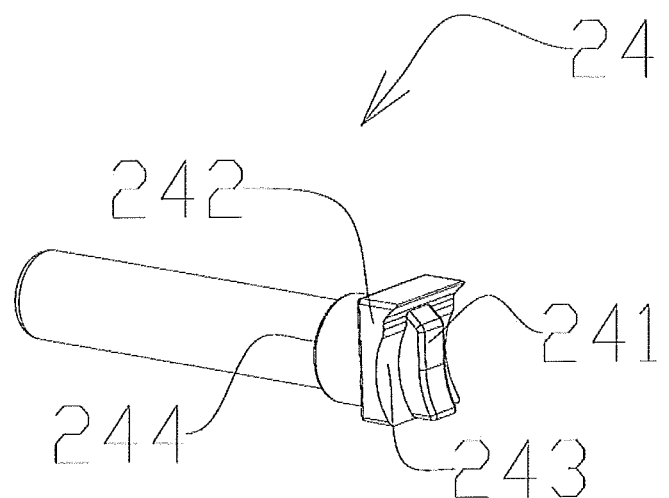
FIG. 6 is a perspective view of a positioning member according to an embodiment of the present application.
Figure 6A:
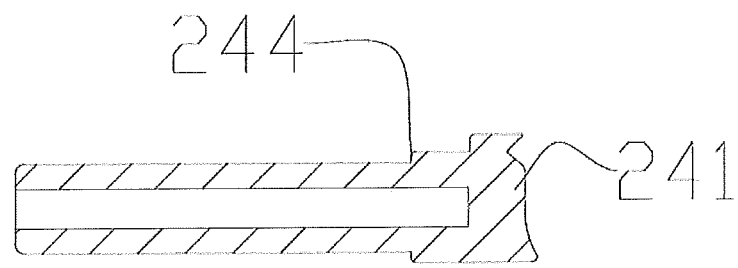
FIG. 6A is a sectional view of a positioning member according to an embodiment of the present application.
Figure 6B:
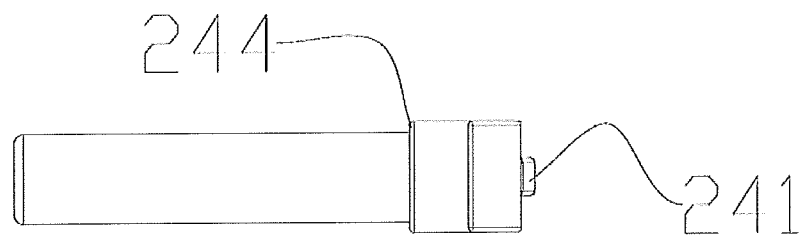
FIG. 6B is a front view of a positioning member according to an embodiment of the present application.

As shown in FIGS. 3 and 5-5B, the valve core 21 is provided with a guiding portion 210. Preferably, the guiding portion 210 is a through hole laterally in the valve core 21. The positioning member 24 can be inserted into the guiding portion 210 and can slide in the guiding portion 210. The valve core 21 is further provided with a connecting portion 211. The connecting portion 211 is formed by integrally protruding outward from an edge of the valve core 21 at one end of the guiding portion 210. A first groove 212 is provided in a middle portion of the connecting portion 211. A locking boss 214 is provided at the bottom of the first groove 212. Second valve stem mounting holes 215 are provided on both sides of the first groove 212. Shoulder mating surfaces 213 are provided on both sides of the rear of the first groove 212. The first groove 212 is used for mounting the driving member 22. The locking boss 214 is used to engage with the locking cam 222 of the driving member 22. The second valve stem mounting hole 215 is used for mounting the valve stem 30. The shoulder mating surface 213 is used for engaging with the control cam 223 of the shoulder 221. The diameter of the second valve stem mounting hole 215 is larger than the outer diameter of the valve stem 30, so that the valve stem 30 can be rotated in the second valve stem mounting hole 215, which will be described in detail below.

As shown in FIG. 5B, a second sealing portion 216 and a third sealing portion 217 are provided on a side of the valve core 21 opposite to the side on which the guiding portion is provided, that is, a side 26 facing the inner valve seat 60. The second sealing portion 216 is located radially outward with respect to the third sealing portion 217. When the valve is in the closed state, the second sealing portion 216 engages with a main sealing portion 602 provided on the inner valve seat 60, and the third sealing portion 217 engages with the first sealing portion 605 on the inner valve seat 60, which will be described in detail below.

As shown in FIGS. 3, 6, 6A and 6B, the positioning member 24 is substantially cylindrical in shape. A protruding block 240 is provided on one end of the positioning member 24. A cam mating surface 241 is provided at the end of the protruding block 240. The cam mating surface 241 is in contact with the control cam 223 of the driving member 22, so that the positioning member 24 is driven to move relative to the valve core 21 by the rotation of the driving member 22. Flanges 242 are provided on both sides of the protruding block. The side of the flange 242 facing the protruding block is provided with an arc surface 243 for giving way to the locking cam 222 of the driving member 22. The positioning member 24 is further provided with a limiting step 244. When the positioning member 24 moves in the guiding portion 210 of the valve core 21, the limiting step 244 limits the elastic member 23 laterally, so that the elastic member 23 can applies a force on the positioning member 24 toward the driving member 22, so that the elastic member 23 can drive the positioning member 24 out of the valve body to unlock.

In this embodiment, the guiding portion 210 is a through hole provided in the valve core 21 in the radial direction. However, those skilled in the art can understand that the guiding portion 210 can also be provided in other ways.

As shown in FIG. 3, during installation, the elastic member 23 is sleeved over the positioning member 24 and is laterally limited by the limiting step 244 at one end. The driving member 22 is installed in the first groove 212 of the valve core 21 such that the first valve stem mounting hole 224 of the driving member 22 is aligned with the second valve stem mounting hole 215. The valve stem 30 is passed through the second valve stem mounting hole 215 on one side and is passed through the first valve stem mounting hole 224, and then is passed through the second valve stem mounting hole 215 on the other side, so as to hinge the valve core 21 to the driving member 22, and movably restrict the positioning member 24 in the guiding portion 210 of the valve core 21, wherein the valve stem 30 is fixedly connected to the driving member 22, that is, the valve stem 30 cannot rotate in the first valve stem mounting hole 224 of the driving member 22, and the valve stem 30 can rotate in the second valve stem mounting hole 215 of the valve core 21, thereby the rotation of the valve stem 30 can drive the rotation of the driving member 22, so that the rotation of the valve stem 30 drives the driving member 22 to rotate and drives the positioning member 24 to move relative to the valve core 21.

Figure 7:
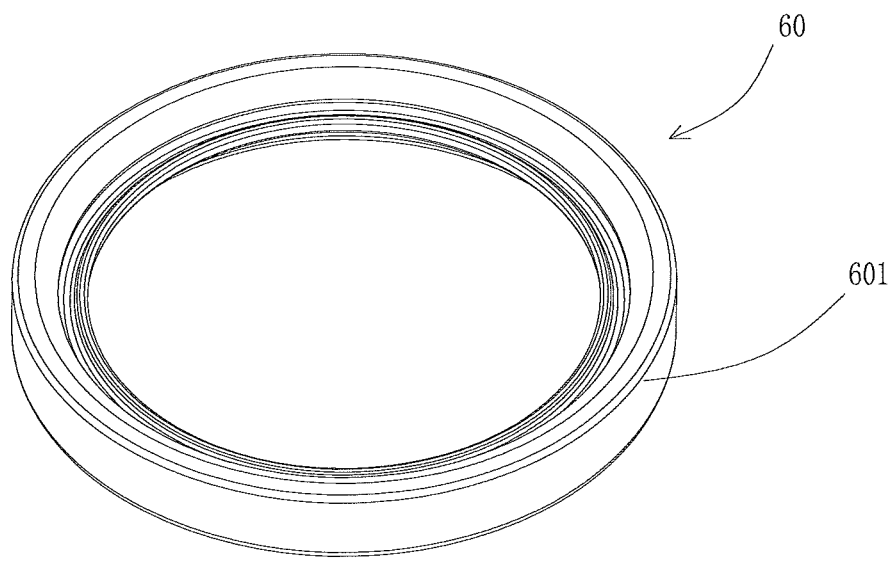
FIG. 7 is a perspective view of an inner valve seat according to an embodiment of the present application.
Figure 7A:
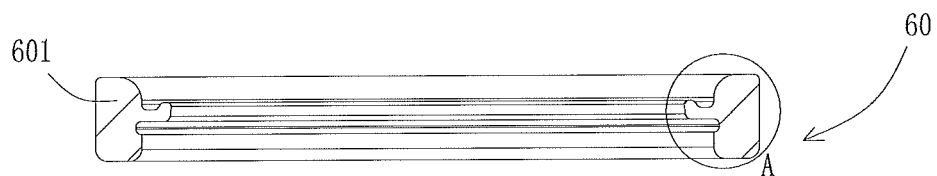
FIG. 7A is a sectional view of the inner valve seat of FIG. 7.
Figure 7B:
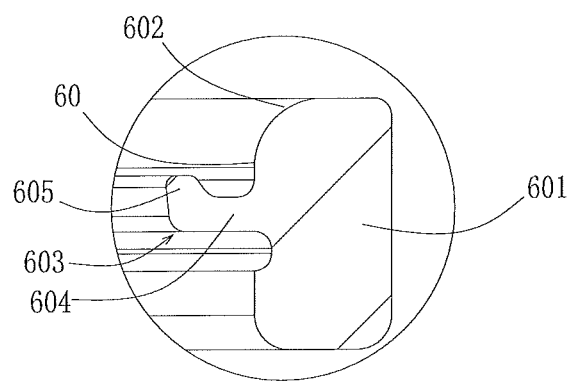
FIG. 7B is an enlarged view of part A of FIG. 7A.

FIG. 7-7B illustrate a structure of an inner valve seat 60 according to an embodiment of the present application. As shown in FIG. 7-7A, the inner valve seat 60 has a annular body 601 and a sealing structure 603 extending inwards from the inner peripheral surface of the annular body. The sealing structure 603 extends radially inward along the entire inner peripheral surface of the annular body and is provided with an elastic portion 604 and a first sealing portion 605 in sequence. Preferably, the sealing structure 603 integrally extends from the inner peripheral surface of the annular body 601. The elastic portion 604 is an annular member having a smaller thickness than the annular body. The first sealing portion 605 protrudes from the distal end of the elastic portion 604 toward the valve core, so that the first sealing portion is substantially hook-shaped as viewed in the cross-sectional view of FIG. 7A.

The inner valve seat 60 is further provided with a main sealing portion 602. The main sealing portion 602 is located inside the top surface of the annular body 601. Herein, the top surface of the annular body refers to a side of the annular body that is the same as the protruding direction of the first sealing portion 605.

When the valve is in the closed state, the main sealing portion 602 and the first sealing portion 605 abut against the side of the valve core 21 facing the inner valve seat 60, that is, abut against the second sealing portion 216 and the third sealing portion 217 of the valve core, respectively.

Figure 8:
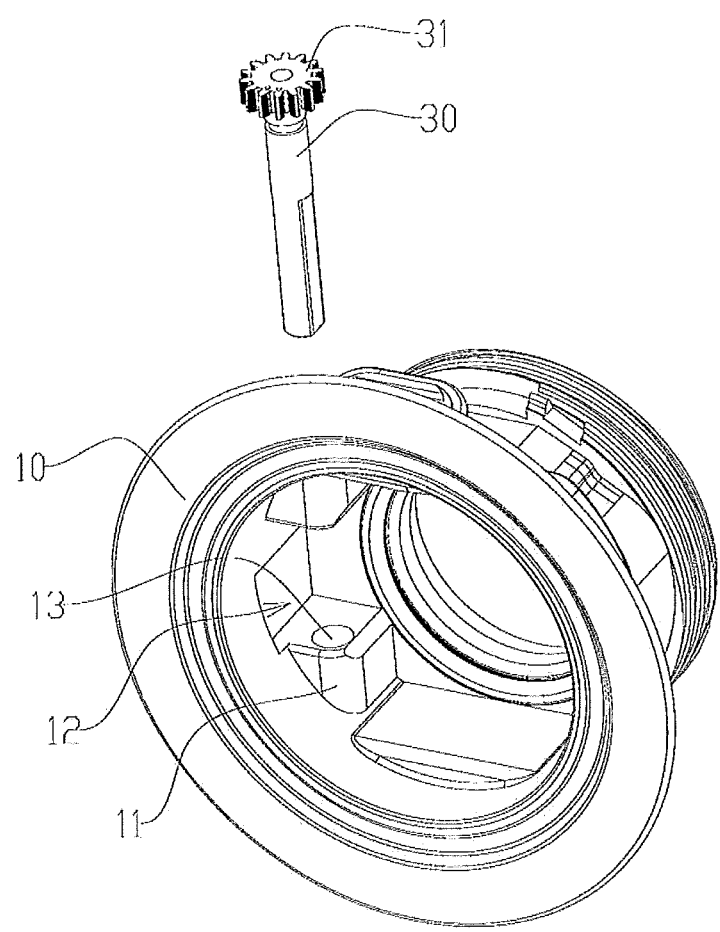
FIG. 8 is an exploded perspective view of a valve stem and a valve body according to an embodiment of the present application.
Figure 8A:
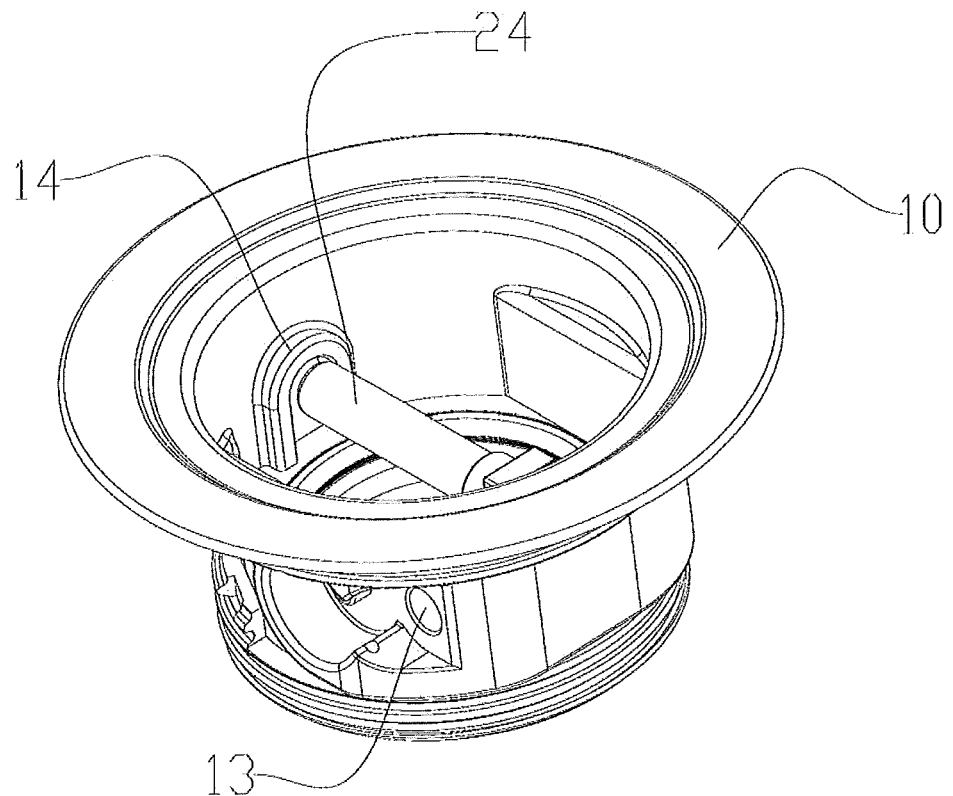
FIG. 8A is a perspective view of a valve body with a positioning member installed according to an embodiment of the present application.
Figure 8B:
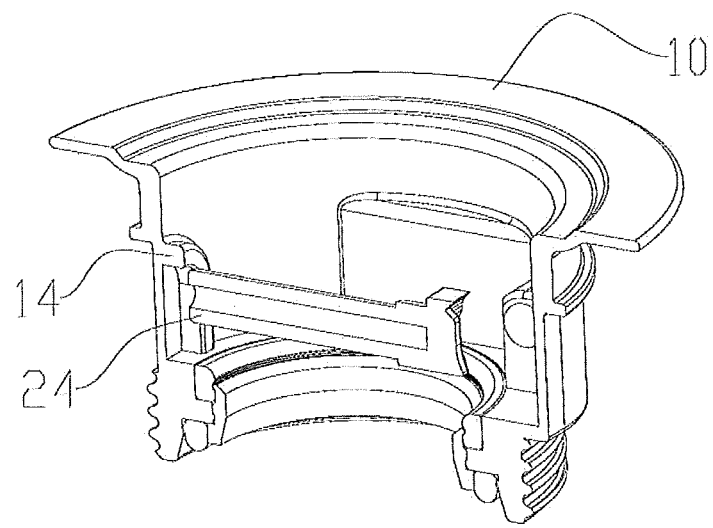
FIG. 8B is a sectional view of the valve body of FIG. 8A.
Figure 8C:
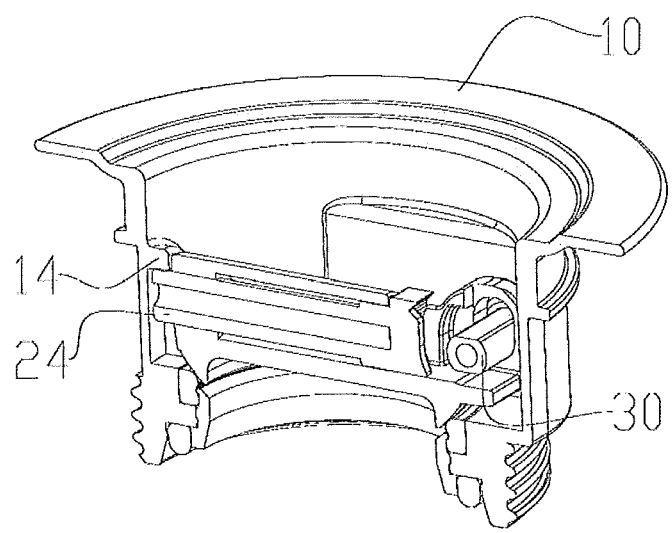
FIG. 8C is a cross-sectional view of a valve body with a positioning member, a driving member, and a valve stem installed according to an embodiment of the present application.

FIGS. 8-8C illustrate the structure and installation diagram of the valve stem, the valve body, the positioning member, and the driving member. As shown in FIGS. 8-8C, a valve body mounting portion 11 is provided in the valve body 10. The valve core mounting portion 11 is provided with a second groove 12. Valve stem positioning holes 13 are provided on both sides of the second groove 12, and the connecting portion 211 of the valve core 21 is installed in the second groove 12. The valve stem 30 is passed through valve stem positioning holes 13 on one side of the valve body 10, is passed through the second valve stem mounting hole 215 on one side of the connecting portion 211, is passed through the first valve stem mounting hole 224 on the driving member 22, and then is passed through the second valve stem mounting hole 215 on the other side of the connecting portion 211, and finally is passed through the valve body positioning hole 13 on the other side of the valve body 10 so as to rotatably connect the valve core 21 to the valve body 10.

As shown in FIGS. 8-8C, a positioning member locking portion 14 is further provided on the inner side wall of the valve body 10, and the positioning member locking portion 14 is a groove. The positioning member locking portion 14 is used to limit the positioning member 24 in vertical direction, so that when the positioning member 24 is in place, the positioning member 24 is locked by the positioning member locking portion 14, which will be described in detail below.

Figure 9:
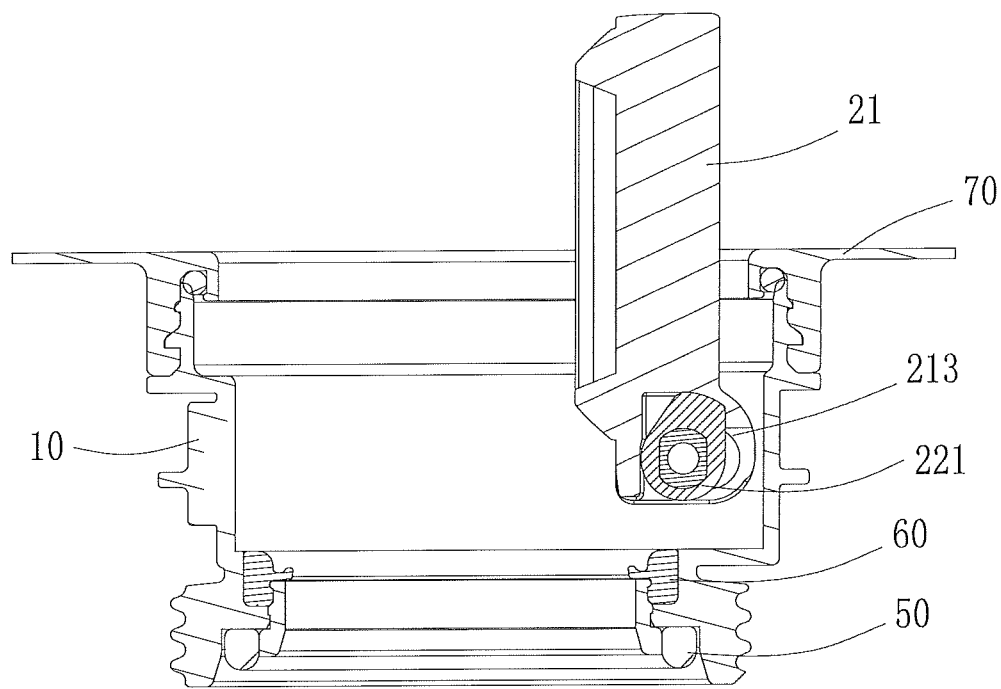
Figure 9A:
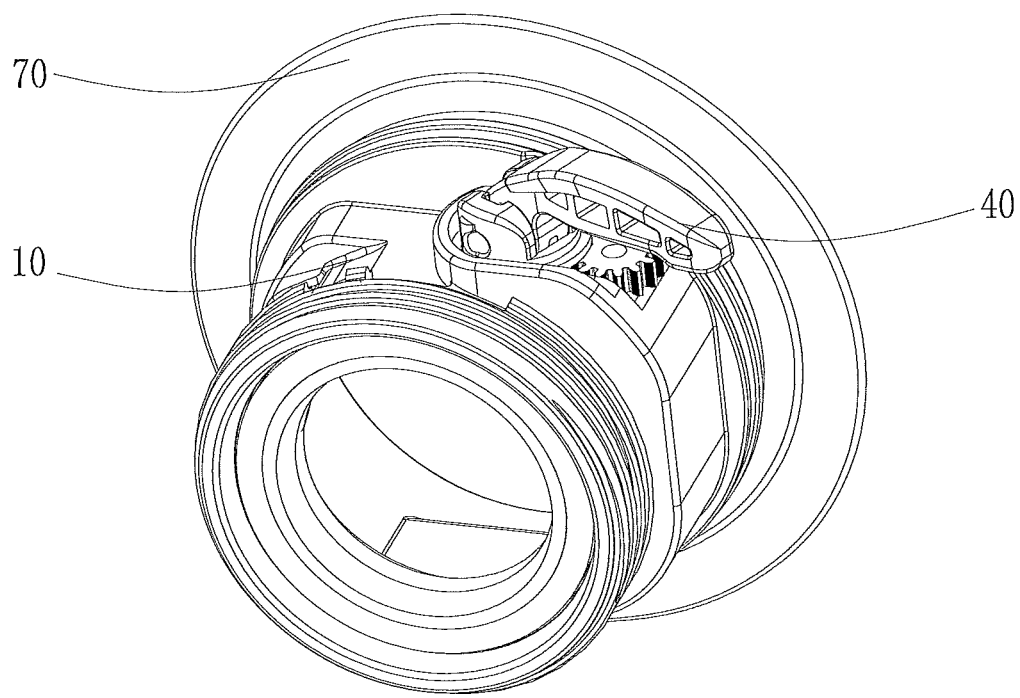
Figure 10:
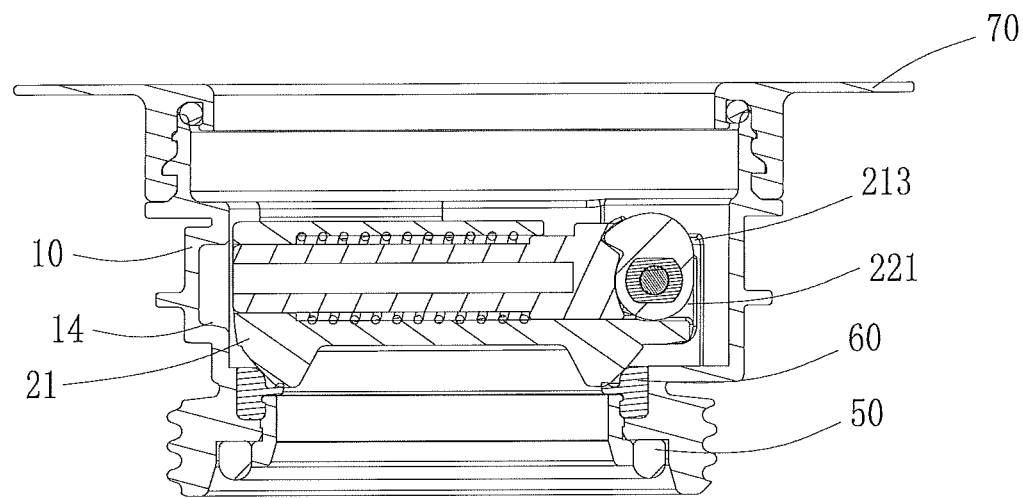
Figure 10A:
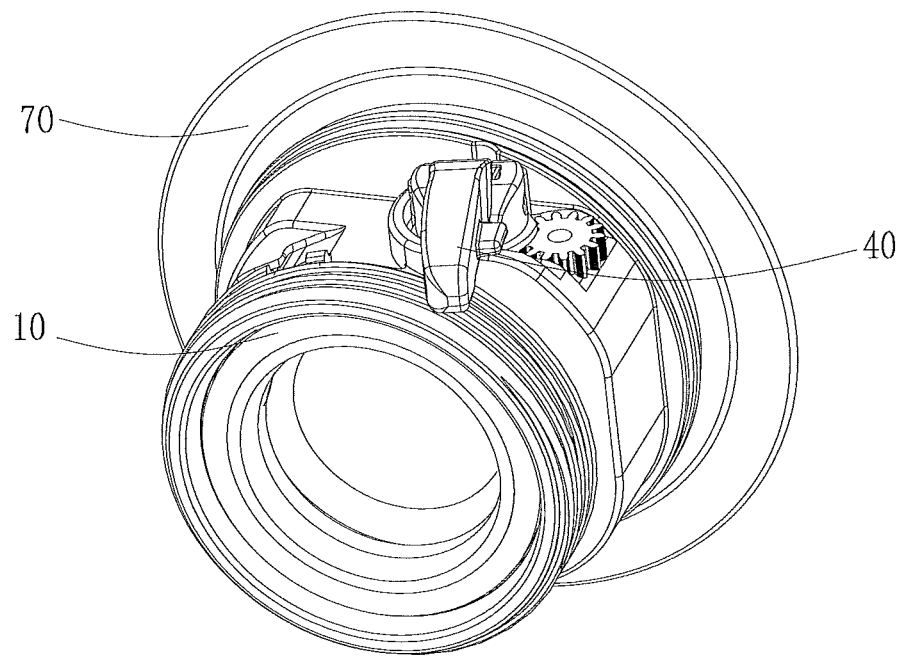
Figure 11:
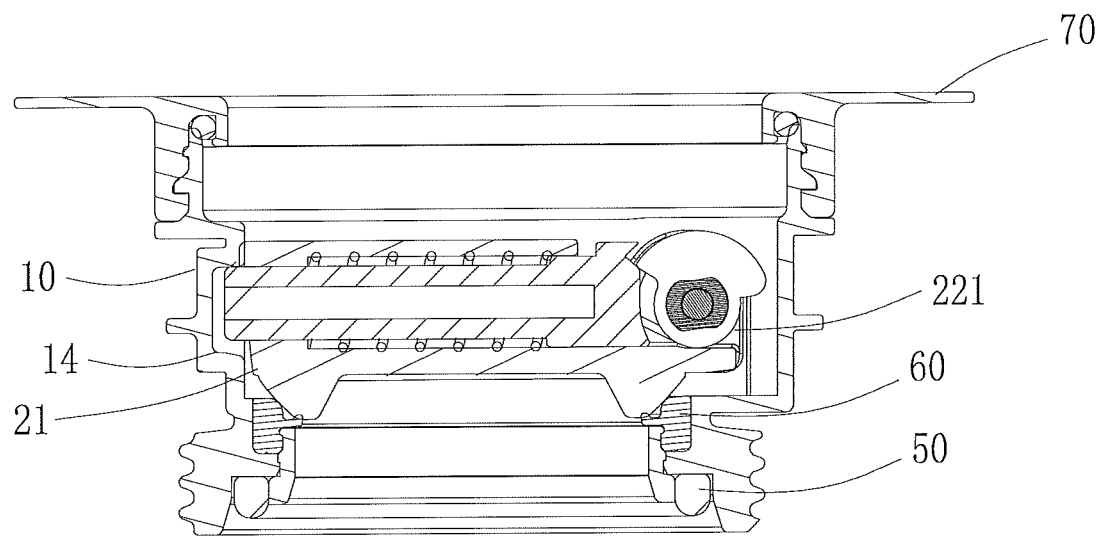
Figure 11A:
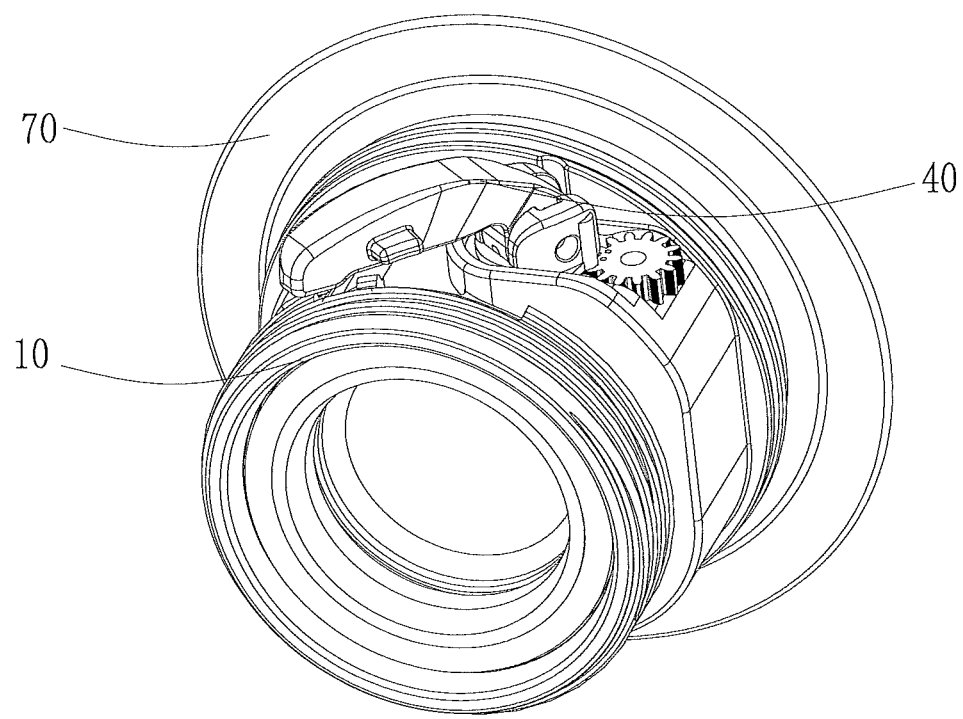
Figure 12:
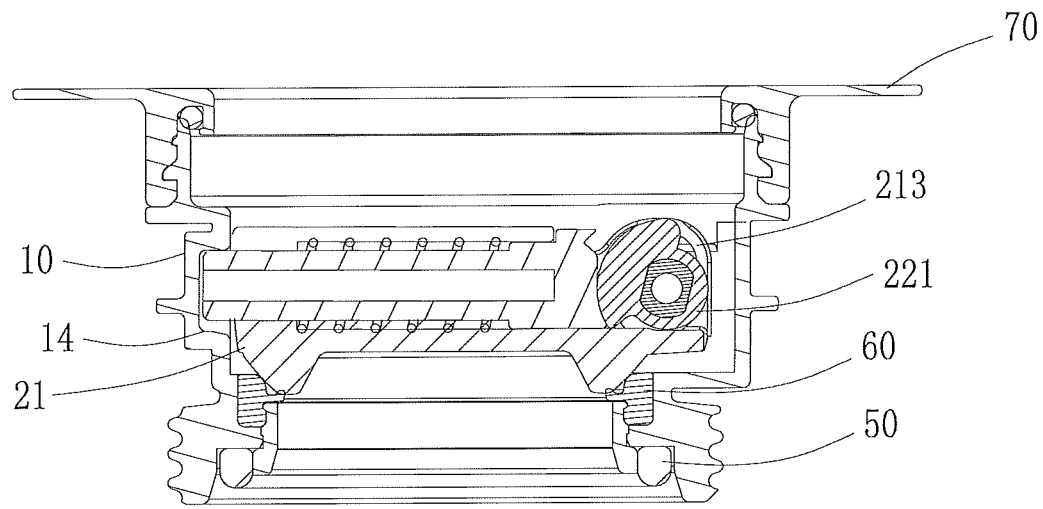
Figure 12A:
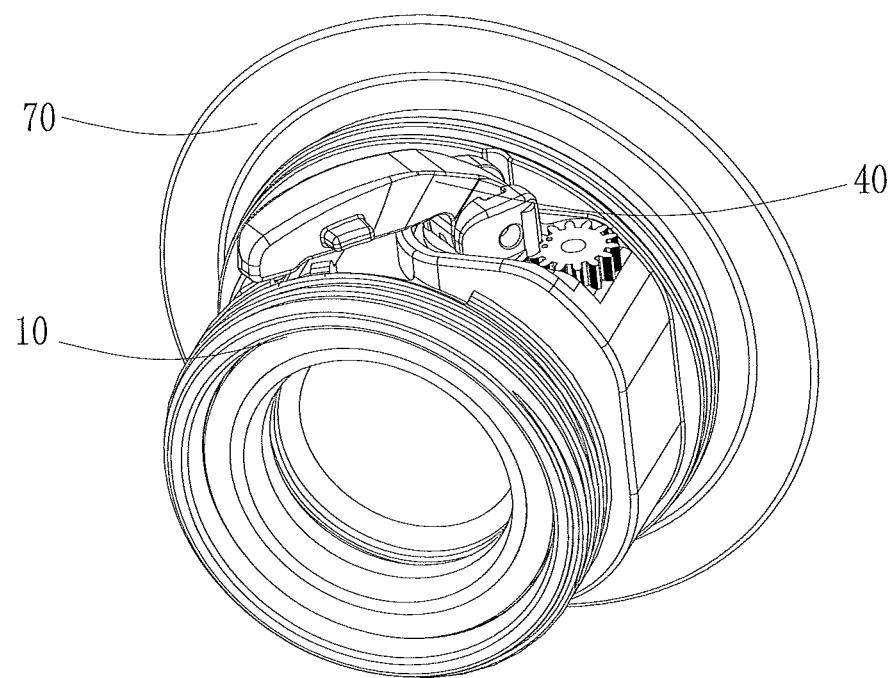
Figure 13:
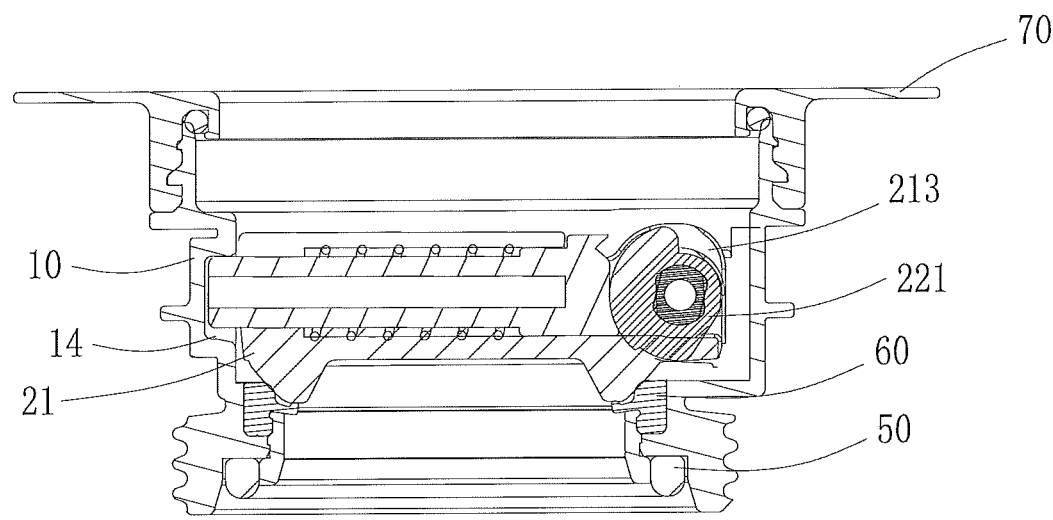
Figure 13A:
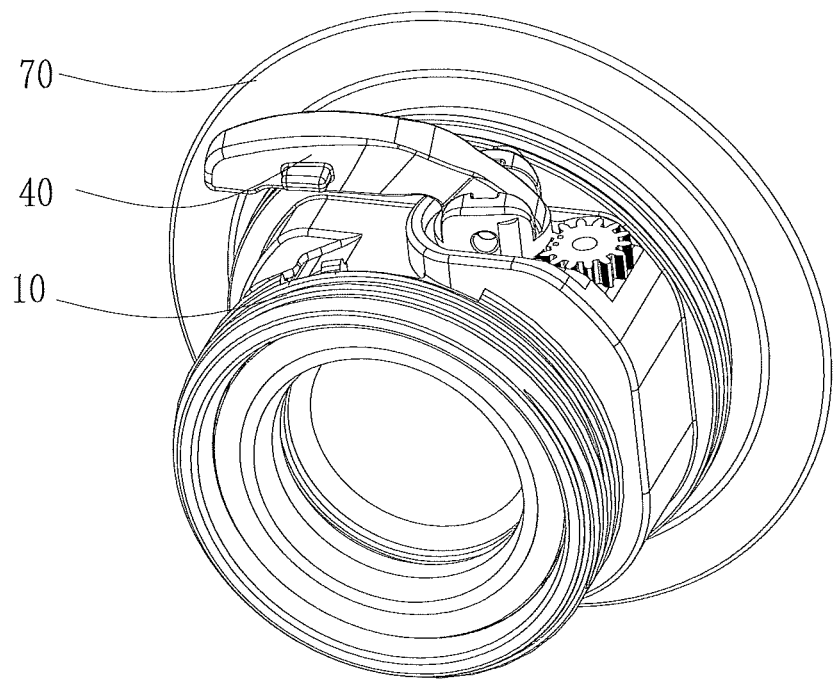

FIGS. 9-13A illustrate a transmission relationship of the valve of the present application during a closing process. Wherein FIGS. 9-9A show the valve in an open state, FIGS. 10-10A show the first transmission relationship, FIGS. 11-12A show the second transmission relationship, and FIGS. 13-13A show the third transmission relationship.

As shown in FIGS. 9-10A, when the valve changes from the open state to the closed state, the driving member 22 cooperates with the positioning member 24 through the elasticity of the elastic member 23 to form a relatively static first transmission relationship, and drives the valve core 21 to rotate, thus close the valve core 21. In the first transmission relationship, the positioning element 24 applies a force to the valve core 21 to close the valve core 21.

As shown in FIGS. 11-12A, when the first transmission relationship ends, the driving member 22 and the positioning member 24 are switched from the first transmission relationship to the second transmission relationship. The driving member 22 presses the positioning member 24 to cause the positioning member 24 to move relative to the valve core 21. In the second transmission relationship, the control cam 223 on the driving member 22 engages with the cam mating surface 241 on the positioning member 24, so that the positioning member 24 is driven by the downward rotation of the control cam 223 and moves laterally in the positioning member guiding portion 210 of the valve core 21 against the elastic force of the elastic member 23 until the front end of the positioning member 24 reaches below the positioning member locking portion 14 of the valve body 10, as shown in FIG. 12. At this time, the edge of the control cam 223 contact with the bottom of the first groove 212 of the valve core 21.

As shown in FIGS. 13-13A, when the second transmission relationship ends, the driving member 22 and the positioning member 24 are switched from the second transmission relationship to the third transmission relationship between the driving member 22 and the valve core 21. The positioning member 24 is controlled by the driving member 22 to be kept in an extended state, so that the positioning member 24 is always in a state of engaging with the valve body 10, and the driving member 22 presses the valve core 21 to perform a press movement toward an axis of the flow passage of the valve, thereby sealingly locking the valve core. In the third transmission relationship, the driving member 22 rotates synchronously under the driving of the valve stem 30. The control cam on the driving member 22 always controls the positioning member 24 to be kept in the extended state. The locking cam 222 on the driving member 22 engages with the locking cam 214 on the valve core 21 to apply a force to the locking cam 214 through the control cam 222, so that the driving member 22 presses the valve core 21 and the inner valve seat 60 to perform a press movement in the axis of the flow passage of the valve under the action of the locking cam 222. The positioning member 24 is always in an extended state, and further rotates around the fulcrum formed by the positioning member locking portion 14 of the valve body 10 until the valve stem 30 rotates into position, and the valve core 21 is locked.

The transmission relationship of the valve opening process is opposite to the transmission relationship of the valve closing process, which can be easily understood by those skilled in the art, thus will not be described in detail herein. It should be noted that during the valve opening process, the driving member 22 realizes the force transmission through the cooperation of the shoulder 221 of the driving member 22 with the shoulder mating surface 213 on the valve core 21, that is, the shoulder 221 applies a force to the shoulder mating surface 213 to open the valve core 21.

In the present application, as preferred embodiments, the positioning member is a positioning rod, and the elastic member is a compression spring. However, those skilled in the art can understand that the positioning member may also adopt other forms, and the elastic member may also adopt other elastic members such as rubber plugs, and the positioning member and the elastic member may also be formed integrally, see below embodiments.

Although in the embodiment described above, the positioning member and the elastic member are separate members. However, in another embodiment, the positioning member and the elastic member may be integrally formed. At this time, the elastic member is provided on the positioning member, for example, by providing an elastic protruding rib on the outer periphery of the positioning member. At this time, the elastic protruding rib serves as an elastic member. When the positioning member is installed in the guiding portion of the valve core, the elastic protruding rib engages with one end of the guiding portion, so that the end of the guiding portion exerts a force on the elastic protruding rib to unlock the positioning member.

In another embodiment, a groove may be provided on the positioning member. An elastic member may be provided in the groove, and a stopping portion may be provided in the guiding portion, such as a stopping pin or a stopping post etc. protruding downward from the upper side wall of the guiding portion. The stopping portion extends into the groove and compresses the elastic member, so that when the positioning member moves relative to the driving member, the elastic member exerts an elastic force on the positioning member under the action of the stopping portion to achieve unlocking of the positioning member.

Although the above is a hinged valve in order to describe the present application, it should be understood that the present application regarding the sealing principle and related structure between the inner valve seat and the valve core, especially the structure of the inner valve seat, also can be used for other applications, such as ball valves, especially those valves in which the valve core is capable of pressing the inner valve seat relative to the valve body and has a movement component along the axis of the flow passage of the valve body. An example of such a valve is referred to the Chinese patent issued under CN103016776B, the contents of which are incorporated herein by reference in their entirety.

The valve of the present application is provided with a sealing structure to seal and/or fill the gap formed between the valve body, the inner valve seat and the valve core, thereby reducing or even eliminating liquid residue in the space among the valve core, the valve body and the valve, and the sealing effect is good.

Aspects of the embodiments can be modified, if necessary, to employ aspects, features, and concepts of the various patents, applications, and publications to provide additional embodiments.

In view of the above detailed description, these and other changes can be made to the embodiments. In general, the terms used in the claims should not be considered limited to the specific embodiments disclosed in the description and the claims, but should be understood to include all possible embodiments together with all equivalents enjoyed by these claims range.

The invention claimed is:

1. A valve, comprising:
   a valve body;
   an inner valve seat; and
   a valve core,
   wherein the valve core is installed in the valve body, and the inner valve seat is installed in the valve body,
   wherein the inner valve seat comprises:
      an annular body,
      a sealing structure,
         wherein the sealing structure extends inwards along an entirety of an inner peripheral surface of the annular body and is provided with an elastic portion and a first sealing portion in sequence,
         wherein the elastic portion extends in a radial direction,
         wherein the first sealing portion protrudes in an axial direction from a distal end of the elastic portion and is configured to press the side of the valve core facing the inner valve seat when the valve is in a closed state,
         wherein the sealing structure is arranged such that when the valve is in the closed state, the sealing structure seals and/or fills gaps formed among the valve body, the inner valve seat, and the valve core, and
      a main sealing portion that is provided on the annular body and that is arranged to abut against the side of the valve core facing the inner valve seat when the valve is in the closed state, and the position where the main sealing portion abuts the valve core is located radially outward compared with the position where the first sealing portion presses the valve core.

2. The valve according to claim 1, wherein a second sealing portion and a third sealing portion are provided on a side of the valve core facing the inner valve seat, wherein the second sealing portion is radially outward with respect to the third sealing portion, and when the valve is in a closed state, the second sealing portion is engaged with the main sealing portion, and the third sealing portion is engaged with the first sealing portion.

3. The valve according to claim 1, wherein the valve core is hinged to the valve body and the valve further includes a handle and a valve stem, wherein the handle is provided with a driving gear, the valve stem is provided with a driven gear, and the driving gear mates with the driven gear, so that rotation of the handle drives the valve stem to rotate, which in turn drives the valve core to rotate.

4. The valve according to claim 1, wherein the valve core is hinged to the valve body and the valve further includes a handle and a valve stem, wherein the handle and the valve stem have different axes of rotation, the handle and the valve stem have a transmission relationship of synchronous rotation, and the rotation of the handle transmits a synchronous rotation with angle amplification to the valve stem, so as to drive the valve core to rotate.

5. The valve according to claim 1,
   wherein the valve core is hinged to the valve body, and the valve further includes:
      a driving member,
      a positioning member, and
      an elastic member,
      wherein the positioning member is movably mounted on the valve core, the elastic member is installed between the positioning member and the valve core, and the disengageable relationship between the driving member and the positioning member imparts the valve with the following three transmission relationships during the closing process:
      the driving member cooperates with the positioning member to form a relatively static first transmission relationship under the elastic action of the elastic member, and drives the valve core to rotate to close the valve core;
      when the first transmission relationship ends, the driving member and the positioning member are switched from the first transmission relationship to a second transmission relationship, in which the driving member presses the positioning member to cause the positioning member to move with respect to the valve core; and
      when the second transmission relationship ends, the driving member and the positioning member are switched from the second transmission relationship to a third transmission relationship between the driving member and the valve core, in which the driving member controls the positioning member to be kept in an extended state so that the positioning member is always in a state of cooperating with the valve body, and the driving member presses the valve core to perform a press movement along the axis of the flow passage of the valve, thereby sealingly locking the valve core.

* * * * *